(12) United States Patent
Friggeri et al.

(10) Patent No.: US 10,152,544 B1
(45) Date of Patent: Dec. 11, 2018

(54) VIRAL CONTENT PROPAGATION ANALYZER IN A SOCIAL NETWORKING SYSTEM

(71) Applicant: Facebook, Inc., Menlo Park, CA (US)

(72) Inventors: Adrien Thomas Friggeri, San Francisco, CA (US); Bogdan State, Menlo Park, CA (US); Lada Ariana Adamic, Menlo Park, CA (US); Erich James Owens, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 423 days.

(21) Appl. No.: 14/841,136

(22) Filed: Aug. 31, 2015

(51) Int. Cl.
*G06F 17/30* (2006.01)
*G06Q 50/00* (2012.01)
*H04L 29/08* (2006.01)

(52) U.S. Cl.
CPC .. *G06F 17/30867* (2013.01); *G06F 17/30958* (2013.01); *G06Q 50/01* (2013.01); *H04L 67/22* (2013.01)

(58) Field of Classification Search
CPC ... G06Q 50/01; H04L 67/22; G06F 17/30867; G06F 17/30958
USPC .......................................................... 707/754
See application file for complete search history.

(56) References Cited

U.S. PATENT DOCUMENTS

| | | | | |
|---|---|---|---|---|
| 7,856,411 | B2 * | 12/2010 | Darr | G06Q 10/10 706/45 |
| 8,839,150 | B2 * | 9/2014 | King | G06F 3/017 715/836 |
| 9,589,304 | B2 * | 3/2017 | Ryu | G06Q 50/01 |
| 2007/0226248 | A1 * | 9/2007 | Darr | G06Q 10/10 707/999.102 |
| 2011/0193788 | A1 * | 8/2011 | King | G06F 3/017 345/173 |
| 2014/0351726 | A1 * | 11/2014 | King | G06F 3/017 715/765 |

* cited by examiner

*Primary Examiner* — Phong H Nguyen
(74) *Attorney, Agent, or Firm* — Baker & Botts L.L.P.

(57) ABSTRACT

Some embodiments include a method of detecting and analyzing virally propagating subject matter in a social networking system. The method includes processing user activities in the social networking system through a relevancy filter to identify a subset of user activities that are relevant to a viral propagation study. The social networking system can construct, in response to selecting a user activity as a graph exploration seed, a user activity cascade by exploring the social graph in the social networking system, starting from a social network node corresponding to the user activity. The user activity cascade can comprise social network nodes found during the graph exploration. The social networking system can determine that the user activity cascade is virally propagating based at least upon a total size of the user activity cascade.

13 Claims, 10 Drawing Sheets

VIRAL CONTENT PROPAGATION ANALYZER IN A SOCIAL NETWORKING SYSTEM

BACKGROUND

Machine intelligence is useful to gain insights to a large quantity of data that is undecipherable to human comprehension. Machine intelligence, also known as artificial intelligence, can encompass machine learning analysis, natural language parsing and processing, computer perception, or any combination thereof. These technical means can facilitate studies and researches yielding specialized insights that are normally not attainable by human mental exercises. Subject matter that is circulated widely (e.g., share with users online "friends" as Prentice said to be "trending" or "going viral."

Machine intelligence can be used to analyze digital conversations, publications, or other user-generated content from human beings. The digital conversations, publications, or other user-generated content can be collectively referred to as digital "chatter." For example, the machine intelligence can identify characteristics, including viral trends, of the digital conversations that are pertinent in making decisions in a social networking system. Various aspects of the social networking system can benefit from knowing whether certain subject matter in the social networking system has gone or is going viral. Yet because of the nature of viral content, computationally, it is expensive and challenging to timely identify user activities that are contributing to viral propagation of content.

Figure 1:
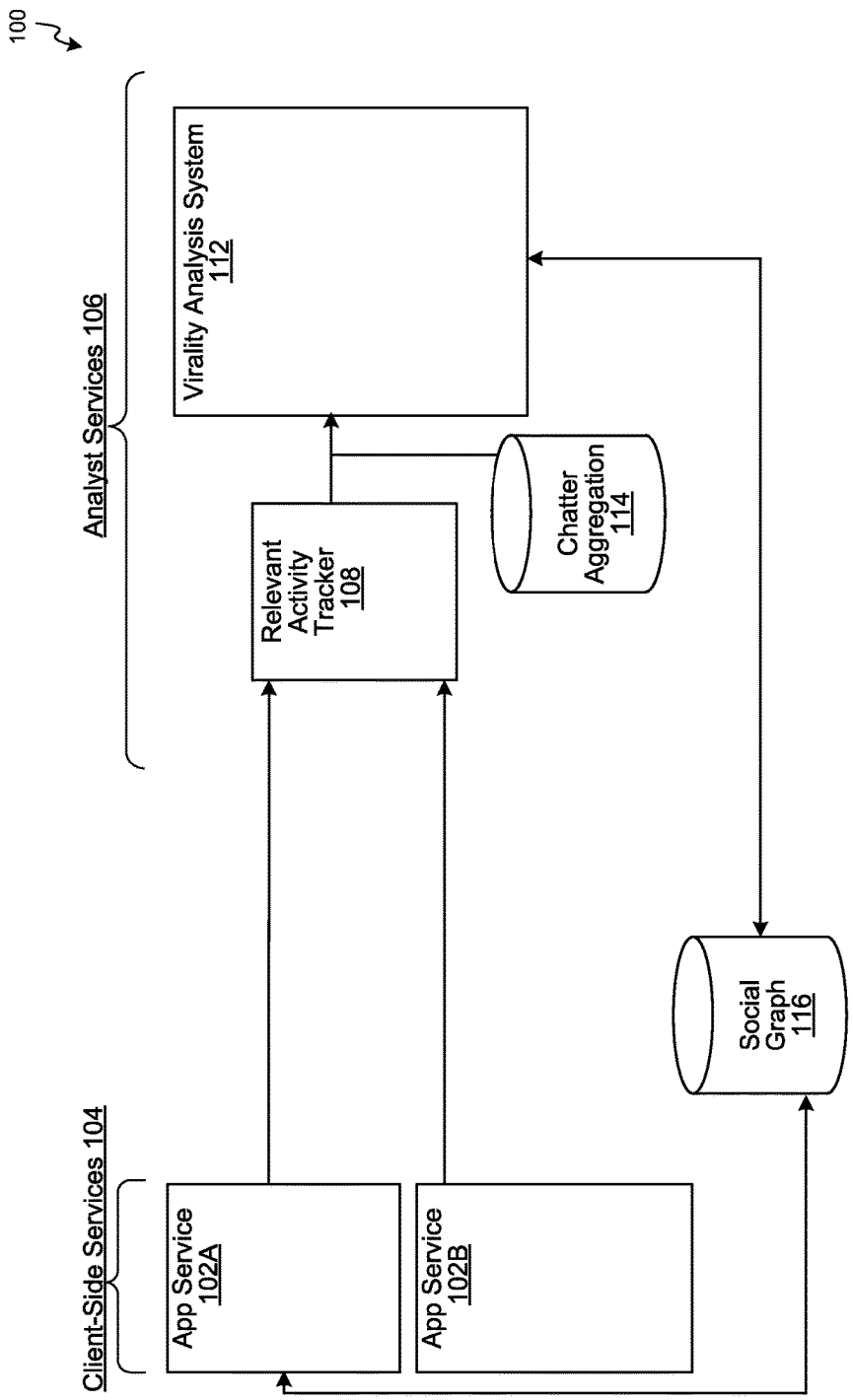
FIG. 1 is a block diagram illustrating a social networking system implementing a virality analysis system, in accordance with various embodiments.

The figures show various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Several embodiments enable viral trend detection and virality analysis in a social graph of a social networking system. A virality analysis system can monitor propagation of various subject matters (e.g., concepts, themes, or topics) involved in user activities in the social networking system to determine whether a subject matter is trending or going viral.

A content filter can receive user activities (e.g., in real-time as user activities are submitted and recorded into a social networking system) from the social networking system. The content filter can select at least some of the user activities for virality analysis. For example, the content filter can match one or more criteria of the content filter against metadata of a user activity, user profile of an acting user of the user activity, and/or substantive content of a content object involved in the user activity. User activities selected by the content filter is passed to a virality analysis system.

The virality analysis system samples the user activities from the content filter. For example, the sampling rate can be equal to or below 1% or less. After a user activity is sampled, a social network node sample in the social graph corresponding to the user activity is used to seed social graph exploration. The virality analysis system can explore the social graph starting from the social network node sample. In some embodiments, the graph exploration is performed without regard to the direction and/or types of social network edges. In some embodiments, the graph exploration is performed along a particular direction and/or one or more particular types of social network edges. The graph exploration continues until one or more stop conditions are met. For example, stop conditions can include running out of social network edges to explore or connecting with a cascade of social network nodes that is already tracked by the virality analysis system. The social network nodes identified during the graph exploration can be compiled into a user activity cascade (e.g., a cluster of related user activities). In some embodiments, the user activity cascade can include user activities that would not have passed through the content filter.

The sampling of the user activities is advantageous because of the high cost of the graph exploration. Because of the social graph exploration, only a single social network node needs to be sampled in order to capture an entire user activity cascade. Accordingly, the sampling of the user activities does not significantly hurt the ability to capture potentially viral conversations. Yet further, the sampling of the user activities acts as a natural filter that prevents creating user activity cascades that is not relevant to a virality study. For example, a user activity (e.g., according to the content filter) relevant to a virality study is unlikely to be within a user activity cascade of irrelevant content and users. Even if such a case exist, it is unlikely that a rare relevant user activity is sampled from amongst a cascade of irrelevant user activities.

A virality determination engine can determine whether a user activity cascade exhibits a viral trend. For example, this determination can be based on relative or absolute attributes of the user activity cascade (e.g., cascade size, cascade expansion rate, cascade diversity, etc.). In some embodiments, this determination may utilize a machine learning model. The machine learning model can be optimized with supervised learning. A dashboard can display one or more trending or viral subject matters and attributes of user activity cascades associated with the trending subject matters. For example, the dashboard can present statistics of the users involved in a cascade, statistics of the user activities in the cascade, a summarization of content in the cascade, and/or a prediction regarding possible changes to the cascade.

Referring now to the figures, FIG. 1 is a block diagram illustrating a social networking system 100 implementing a virality analysis system 112, in accordance with various embodiments. The social networking system 100 provides one or more application services (e.g., an application service 102A and an application service 102B, collectively as the "application services 102") to client devices over one or more networks (e.g., a local area network and/or a wide area network). The application services 102 can enable users of the client devices to push user-generated content (e.g., messages, posts, status updates, or any combination thereof) to the social networking system 100 for sharing with other users.

The social networking system 100 can provide the application services 102 via an application programming interface (API), a Web server, a mobile service server (e.g., a server that communicates with client applications running on mobile devices), or any combination thereof. In some embodiments, the social networking system 100 can be a social networking system (e.g., the social networking system 902 of FIG. 9). The application services 102 can process client requests in real-time. The client requests can be considered "live traffic." For example, the application services 102 can include a search engine, a photo editing tool, a location-based tool, an advertisement platform, a media service, an interactive content service, a messaging service, a social networking service, or any combination thereof.

The social networking system 100 can include one or more client-side services 104 that are exposed to the client devices, directly or indirectly. The social networking system 100 can also include one or more analyst services 106. In some embodiments, the analyst services 106 are not exposed to the client devices. In some embodiments, the analyst services 106 are exposed to a limited subset of the client devices. In some cases, the analyst services 106 can be used by operators (e.g., machine agents or human agents) of the social networking system 100 to gain insights based on activities of the client-side services 104 (e.g., in real-time or asynchronously relative to the activities). In some embodiments, outputs (e.g., insights to the conversations of users) of the analyst services 106 can be used to monitor, maintain, or improve the application services 102 and/or trigger automated responses by the client-side services 104. In some embodiments, the analyst services 106 are implemented on a system external to and separate from the social networking system 100.

The social networking system 100 can include or be coupled to a relevant activity tracker 108 and the virality analysis system 112. The relevant activity tracker 108 and the virality analysis system 112 can be part of the analyst services 106. The relevant activity tracker 108 can monitor user activities with the application services 102 to determine whether any of the user activities match a set of relevancy criteria. In some embodiments, the relevant activity tracker 108 can be coupled to the action logger 914 of FIG. 9.

In some embodiments, the relevant activity tracker 108 acts as a content filter to extract relevant user activities. The relevant activity tracker 108 can filter based on one or more user profile attributes (e.g., user demographics) of acting users of the user activities, one or more metadata attributes of the user activities, one or more content attributes of content objects involved in the user activities, or any combination thereof. In some embodiments, the relevant activity tracker 108 can store the selected user activities in a chatter aggregation repository 114. In these embodiments, the virality analysis system 112 can access the selected user activities in bulk for viral trend analysis. In some embodiments, the relevant activity tracker 108 can pass the selected user activities sequentially to the virality analysis system 112 for viral trend analysis (e.g., a user activity is passed to the virality analysis system 112 in response to selecting each user activity).

The virality analysis system 112 can traverse a social graph 116 starting from a social networking node representing a sample activity among the selected user activities. For example, the social graph 116 can be stored in the edge store 918 of FIG. 9. The virality analysis system 112 can add social network nodes, identified during the traversal, to a user activity cascade. The traversal (e.g., sequential exploration from node to node via edges connecting the nodes) can terminate either when no additional node can be found or when the traversal lands at a social network node within another user activity cascade already monitored by the virality analysis system 112. The virality analysis system 112 can determine whether the user activity cascade is virally propagating. When the user activity cascade is virally propagating, the virality analysis system 112 can perform additional analysis on the user activity cascade to provide insights regarding the nature of the viral subject matter.

In one embodiment, the relevant activity tracker 108 can filter content by matching content against one or more concept identifiers. The concept identifiers are ways of identifying content (e.g., user-generated digital chatter) as being related to a central theme. Concept identifiers can include, for example, topic tags, hashtags, and/or term objects. A topic tag, for example, can be represented as a social network page. A hashtag is a word that may be found within user-generated content denoting an authoring user's intention for the content to be part of a topic or theme. A hashtag can have a known prefix or suffix (e.g., typically a prefix of the pound symbol "#"). A hashtag can be represented as a social network object. A term object can be a text string comprised of two or more consecutive words.

User-generated content can be associated with a topic tag based on a topic inference engine or based on user indication (e.g., an explicit mention in a post or a status update). A topic tag can be a reference to a social network page. The topic tag can be associated with a content object in one or more ways. In one example, a social networking system can implement a topic inference module that infers topics based on content items in user-generated content. For example, U.S. patent application Ser. No. 13/589,693, entitled "Providing Content Using Inferred Topics Extracted from Communications in a Social Networking System" discloses a way to infer interests based on extracted topics from content items in a social networking system. In another example, an authoring user of a content object can associate the topic tag with the content object that the authoring user creates. For example, this association can occur by an explicit reference to a social networking page in a user post (e.g., a social network "mention") or an explicit reference in a status update or minutia. In some cases, a user visiting a social network object can make the topic tag.

A hash tag is an example of a concept identifier that associates with content based on the authoring user of the content. A hashtag is a word or phrase preceded by a hash or pound sign ("#") to identify messages relating to a specific topic. The authoring user can insert the hashtag in a piece of content he or she generates. For example, a hashtag can appear in any user-generated content of social media platforms, such as the social networking system 902 of FIG. 9.

A term object is a set of words (e.g., bigrams, trigrams, etc.) that may be tracked by the social networking system. In some embodiments, while the topic tag is associated with a social network page in a social graph of the social networking system, a term object is not part of the social graph. In these embodiments, term objects are tracked in user-generated content via the relevant activity tracker 108 once it is explicitly defined.

In some cases, a concept identifier may be associated with other concept identifiers according to a grouping of known similar concepts in the social networking system 100. For example, a social networking system can implement a system to cluster social network pages having the same or substantially similar title or description and select one of the social network pages and its associated topic tag as the canonical topic tag associated with the title or description. A concept identifier that references a canonical topic tag can reference multiple social network pages within that a cluster corresponding to the canonical topic tag. For example, U.S. patent application Ser. No. 13/295,000, entitled "Determining a Community Page for a Concept in a Social Networking System" discloses a way for equivalent concepts expressed across multiple domains to be matched and associated with a metapage generated by a social networking system.

Figure 9:
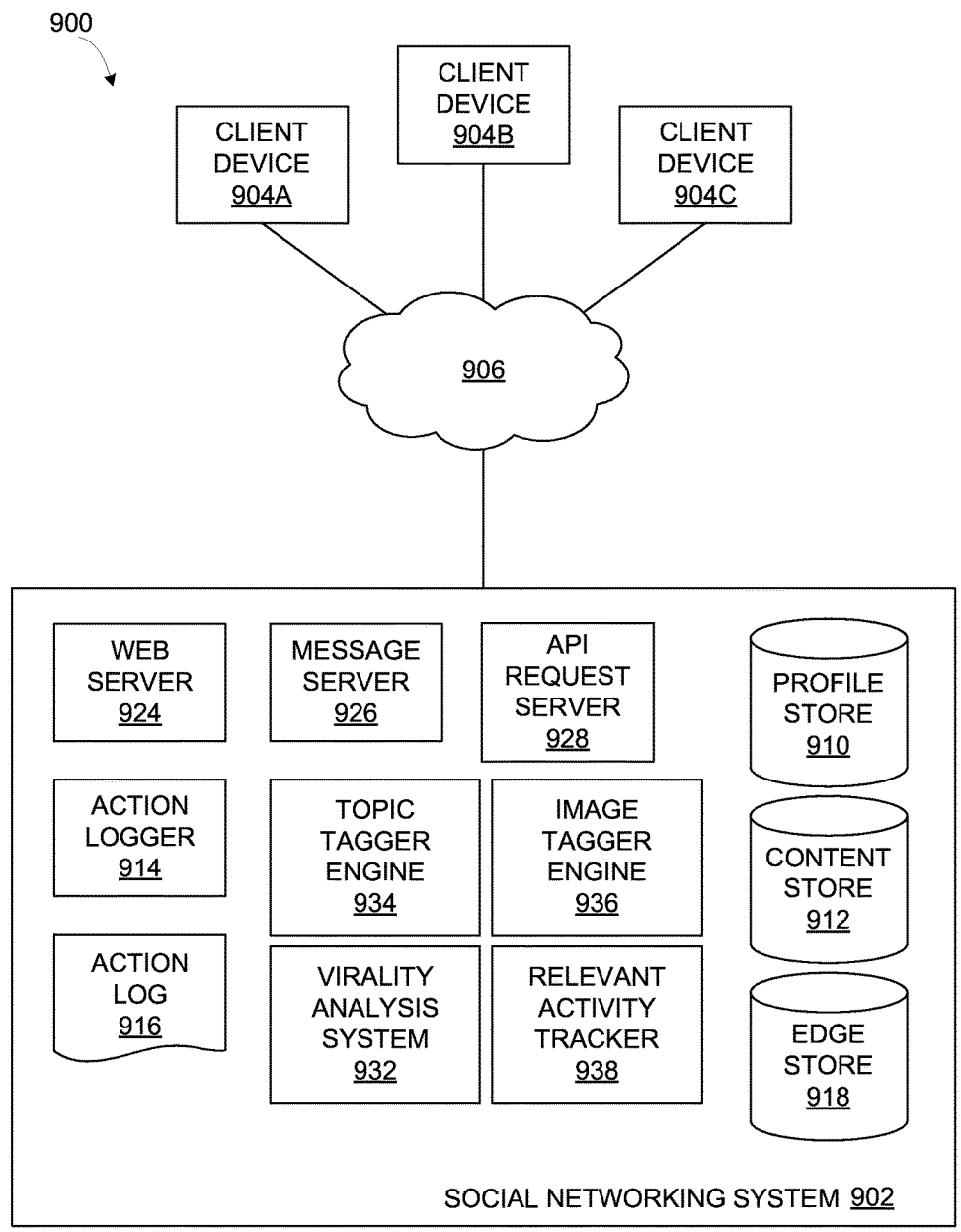
FIG. 9 is a high-level block diagram of a system environment suitable for a social networking system, in accordance with various embodiments.

In some embodiments, one or more objects (e.g., social network objects) of a social networking system (e.g., the social networking system 100 or the social networking system 902 of FIG. 9) may be associated with a privacy setting. The privacy settings (or "access settings") for an object may be stored in any suitable manner, for example, in association with the object or in an index on an authorization server. A privacy setting of an object may specify how the object (or particular information associated with an object) can be accessed (e.g., viewed or shared) using the social networking system. Where the privacy settings for an object allow a particular user to access that object, the object may be described as being "visible" with respect to that user.

For example, a user of the social networking system may specify privacy settings for a user-profile page that identify a set of users that may access the work experience information on the user-profile page, thus excluding other users from accessing the information. In some embodiments, the privacy settings may specify a "blocked list" of users that should not be allowed to access certain information associated with the object. In other words, the blocked list may specify one or more users or entities (e.g., groups, companies, application services, etc.) for which an object is not visible. For example, a user may specify a set of users that may not access photos albums associated with the user, thus excluding those users from accessing the photo albums (while also possibly allowing certain users not within the set of users to access the photo albums).

In some embodiments, privacy settings may be associated with particular social-graph elements. Privacy settings of a social-graph element, such as a node or an edge, may specify how the social-graph element, information associated with the social-graph element, or content objects associated with the social-graph element can be accessed using the social networking system. For example, a social network object corresponding to a particular photo may have a privacy setting specifying that the photo may only be accessed by users tagged in the photo and their friends. In some embodiments, privacy settings may allow users to opt in or opt out of having their actions logged by social networking system or shared with other systems (e.g., internal or external to the social networking system). In some embodiments, the privacy settings associated with an object may specify any suitable granularity of permitted access or denial of access. For example, access or denial of access may be specified for particular users (e.g., only me, my roommates, and my boss), entities, applications services, groups of entities, users or entities within a particular degrees-of-separation (e.g., friends, or friends-of-friends), user groups (e.g., the gaming club, my family), user networks (e.g., employees of particular employers, students or alumni of particular university), all users ("public"), no users ("private"), users of external systems, particular applications (e.g., third-party applications, external websites, etc.), other suitable users or entities, or any combination thereof. Although this disclosure describes using particular privacy settings in a particular manner, this disclosure contemplates using any suitable privacy settings in any suitable manner.

In some embodiments, one or more servers may be authorization/privacy servers for enforcing privacy settings. In response to a request from a user or an entity for a particular object stored in a data store of the social networking system, the social networking system may send a request to the data store for the object. The request may identify the user or entity associated with the request and may only fulfill the request if the authorization server determines that the user is authorized to access the object based on the privacy settings associated with the object. If the requesting user is not authorized to access the object, the authorization server may prevent the requested object from being retrieved, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Social Networking System Overview

Several embodiments of the social networking system 100 utilize or are part of a social networking system. Social networking systems commonly provide mechanisms enabling users to interact with objects and other users both within and external to the context of the social networking system. A social networking system user may be an individual or any other entity, e.g., a business or other non-person entity. The social networking system may utilize a web-based interface or a mobile interface comprising a series of inter-connected pages displaying and enabling users to interact with social networking system objects and information. For example, a social networking system may display a page for each social networking system user comprising objects and information entered by or related to the social networking system user (e.g., the user's "profile").

Social networking systems may also have pages containing pictures or videos, dedicated to concepts, dedicated to users with similar interests ("groups"), or containing communications or social networking system activity to, from or by other users. Social networking system pages may contain links to other social networking system pages, and may include additional capabilities, e.g., search, real-time communication, content-item uploading, purchasing, advertising, and any other web-based inference engine or ability. It should be noted that a social networking system interface may be accessible from a web browser or a non-web browser application, e.g., a dedicated social networking system application executing on a mobile computing device or other computing device. Accordingly, "page" as used herein may be a web page, an application interface or display, a widget displayed over a web page or application, a box or other graphical interface, an overlay window on another page (whether within or outside the context of a social networking system), or a web page external to the social networking system with a social networking system plug in or integration capabilities.

As discussed above, a social graph can include a set of nodes (representing social networking system objects, also known as social objects) interconnected by edges (representing interactions, activity, or relatedness). A social networking system object may be a social networking system user, nonperson entity, content item, group, social networking system page, location, application, subject, concept or other social networking system object, e.g., a movie, a band, or a book. Content items can include anything that a social networking system user or other object may create, upload, edit, or interact with, e.g., messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Subjects and concepts, in the context of a social graph, comprise nodes that represent any person, place, thing, or idea.

A social networking system may enable a user to enter and display information related to the user's interests, education and work experience, contact information, demographic information, and other biographical information in the user's profile page. Each school, employer, interest (for example, music, books, movies, television shows, games, political views, philosophy, religion, groups, or fan pages), geographical location, network, or any other information contained in a profile page may be represented by a node in the social graph. A social networking system may enable a user to upload or create pictures, videos, documents, songs, or other content items, and may enable a user to create and schedule events. Content items and events may be represented by nodes in the social graph.

A social networking system may provide various means to interact with nonperson objects within the social networking system. For example, a user may form or join groups, or become a fan of a fan page within the social networking system. In addition, a user may create, download, view, upload, link to, tag, edit, or play a social networking system object. A user may interact with social networking system objects outside of the context of the social networking system. For example, an article on a news web site might have a "like" button that users can click. In each of these instances, the interaction between the user and the object may be represented by an edge in the social graph connecting the node of the user to the node of the object. A user may use location detection functionality (such as a GPS receiver on a mobile device) to "check in" to a particular location, and an edge may connect the user's node with the location's node in the social graph.

A social networking system may provide a variety of communication channels to users. For example, a social networking system may enable a user to email, instant message, or text/SMS message, one or more other users; may enable a user to post a message to the user's wall or profile or another user's wall or profile; may enable a user to post a message to a group or a fan page; or may enable a user to comment on an image, wall post or other content item created or uploaded by the user or another user. In least one embodiment, a user posts a status message to the user's profile indicating a current event, state of mind, thought, feeling, activity, or any other present-time relevant communication. A social networking system may enable users to communicate both within and external to the social networking system. For example, a first user may send a second user a message within the social networking system, an email through the social networking system, an email external to but originating from the social networking system, an instant message within the social networking system, and an instant message external to but originating from the social networking system. Further, a first user may comment on the profile page of a second user, or may comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection is a social network edge. Being friends in a social networking system may allow users access to more information about each other than would otherwise be available to unconnected users. For example, being friends may allow a user to view another user's profile, to see another user's friends, or to view pictures of another user. Likewise, becoming friends within a social networking system may allow a user greater access to communicate with another user, e.g., by email (internal and external to the social networking system), instant message, text message, phone, or any other communicative interface. Being friends may allow a user access to view, comment on, download, endorse or otherwise interact with another user's uploaded content items. Establishing connections, accessing user information, communicating, and interacting within the context of the social networking system may be represented by an edge between the nodes representing two social networking system users.

In addition to explicitly establishing a connection in the social networking system, users with common characteristics may be considered connected (such as a soft or implicit connection) for the purposes of determining social context for use in determining the topic of communications. In at least one embodiment, users who belong to a common network are considered connected. For example, users who attend a common school, work for a common company, or belong to a common social networking system group may be considered connected. In at least one embodiment, users with common biographical characteristics are considered connected. For example, the geographic region users were born in or live in, the age of users, the gender of users and the relationship status of users may be used to determine whether users are connected. In at least one embodiment, users with common interests are considered connected. For example, users' movie preferences, music preferences, political views, religious views, or any other interest may be used to determine whether users are connected. In at least one embodiment, users who have taken a common action within the social networking system are considered connected. For example, users who endorse or recommend a common object, who comment on a common content item, or who RSVP to a common event may be considered connected. A social networking system may utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figure 2:
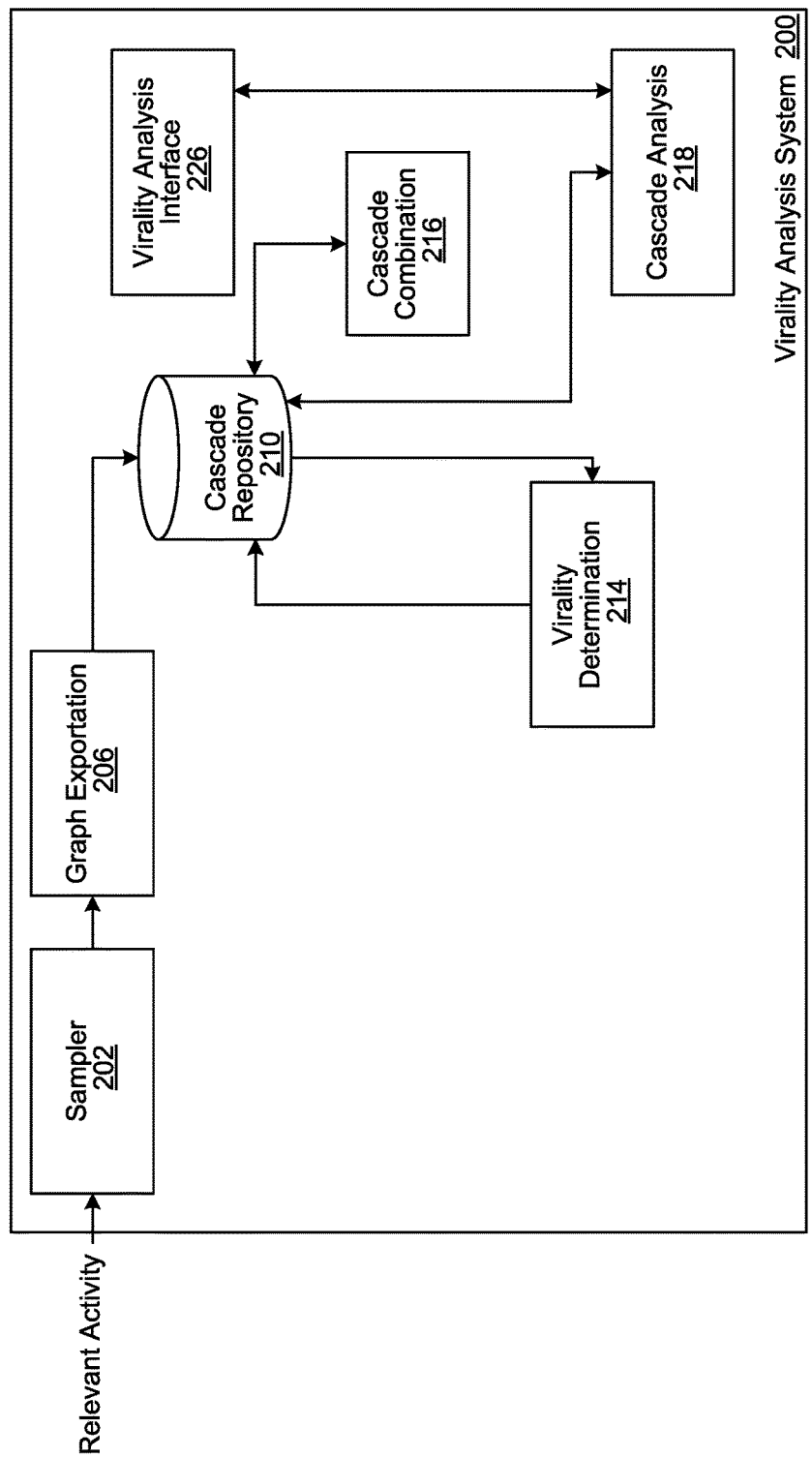
FIG. 2 is a block diagram illustrating a virality analysis system, in accordance with various embodiments.

FIG. 2 is a block diagram illustrating a virality analysis system 200, in accordance with various embodiments. The virality analysis system 200 can be the virality analysis system 112 of FIG. 1. The virality analysis system 200 can include a sampler engine 202, a graph exploration engine 206, a cascade repository 210, a virality determination engine 214, a cascade combination engine 216, a cascade analysis engine 218, a virality analysis interface 226, or any combination thereof.

In some embodiments, the virality analysis system 200 includes the sampler engine 202. The sampler engine 202 can be configured to receive user activities (e.g., as a live feed or in batches) from a relevancy filter (e.g., the relevant activity tracker 108 of FIG. 1) and to select a subset of these user activities for the graph exploration engine 206. In some embodiments, the sampler engine 202 can randomly select a user activity while ignoring other user activities passed from the relevancy filter. In some embodiments, the sampler engine 202 can periodically or systematically select a user activity passed from the relevancy filter while ignoring other user activities outside of a systematic schedule (e.g., the systematic schedule indicating when to select a user activity by based on time or count). A user activity selected by the sampler engine 202 can be passed to the graph exploration engine 206 as a seed for social graph exploration.

The graph exploration engine 206 can be configured to construct a user activity cascade by exploring a social graph (e.g., the social graph 116 of FIG. 1) in a social networking system (e.g., the social networking system 100 of FIG. 1). The social graph exploration can start from a social object node corresponding to a user activity indicated as relevant for a viral propagation study (e.g., by the relevant activity tracker 108 of FIG. 1). In some embodiments, the user activity is a sampled user activity selected by the sampler engine 202. In some embodiments, the user activity is directly from the relevancy filter. The graph exploration engine 206 can construct the user activity cascade from social network nodes found during the social graph exploration.

In several embodiments, the social network nodes correspond to user-generated content objects. For example, the graph exploration engine 206 can be seeded by a sample content object involved in the sample user activity selected by the sampler engine 202. For example, the selected sample user activity can be a content generation activity (e.g., that produces the sample content object), a content publication activity (e.g., that publishes or shares the sample content object), a content engagement activity (e.g., that describes an acting user's engagement with the sample content object), or any combination thereof.

The cascade repository 210 can be configured to maintain an index of one or more user activity cascades. For example, the graph exploration engine 206 can store an index of the user activity cascade produced during the social graph exploration. For example, the index of the user activity cascade can store identifiers of social network nodes within the user activity cascade. The index of the user activity cascade can also include a total count of the social network nodes in the user activity cascade. In some embodiments, the cascade repository 210 can store the analytical data computed by the cascade analysis engine 218.

The virality determination engine 214 can monitor the user activity cascades in the cascade repository 210. For example, the virality determination engine 214 can be configured to determine and flag whether a user activity cascade is virally propagating. This determination can be based on one or more attributes of the user activity cascade. For example, the attributes can include a total count of social network nodes in the user activity cascade, a total number of users involved in the social network nodes in the user activity cascade, a rate of increase of the total count, a rate of increase of the total number of users involved, an average timestamp of the creation of the social network nodes, an average timestamp of social network edges connecting the social network nodes, or any combination thereof.

In some embodiments, the virality analysis system 200 includes a cascade combination engine 216. The cascade combination engine 216 can compute similarities between two or more user activity cascades in the cascade repository 210 to determine whether to combine them. Similarities can include content similarities (e.g., co-occurrence of certain key terms), audience similarities (e.g., co-involvement of certain users), temporal similarities (e.g., the cascades' social network nodes and/or social network edges being created within a similar time frame), metadata similarities (e.g., geolocation similarities, language similarities, etc.), or any combination thereof. The cascade combination engine 216 can maintain one or more predefined thresholds within which two user activity cascades can be considered similar enough for combination. Once the cascade combination engine 216 determines that two or more cascades are considered sufficiently similar, the cascade combination engine 216 can merge the cascades.

The virality analysis system 200 can generate a virality analysis interface 226. The user activity cascades produced by the graph exploration engine 206 and/or flagged by the virality determination engine 214 can be displayed on the virality analysis interface 226. For example, the virality analysis interface 226 can present a window displaying analytic insights corresponding to a specific user activity cascade or a comparison of two or more user activity cascades.

The cascade analysis engine 218 can be configured to compute the analytical insights and/or the comparison for the virality analysis interface 226. For example, the cascade analysis engine 218 can compute viral statistics measuring or estimating the degree of virality of the user activity cascade, demographic statistics involving the acting users associated with the social network nodes in the user activity cascade, content analysis in content objects associated with the social networks in the user activity cascade, a computed prediction of how the viral statistics would change going forward, or any combination thereof. In some embodiments, the results of the cascade analysis engine 218 can be fed into an application service (e.g., at least one of the application services 102 of FIG. 1) of the social networking system to facilitate decision-making of the application service.

For example, the application service can be an internal service (e.g., not directly servicing the users) for load-balancing computational resources of the social networking system. The analytical insights computed from the cascade analysis engine 218 may give an accurate prediction of upcoming service request traffic to the social networking system and the nature of the upcoming service requests. In another example, the application service can be an advertisement service to determine what subject matter is trending and whether to modify an electronic advertising activity according to the increase or reduction of viral propagation of the subject matter. In yet another example, the application service can be a public relation service for facilitating enterprise users in managing (e.g., protecting against or promoting) public exposures of virally propagating discussions or content associated with the enterprise users.

In some embodiments, the virality analysis interface 226 can include a viral statistic panel that includes statistics involving the user activity cascade (e.g., the attributes used to determine whether the user activity cascade is virally propagating). In some embodiments, the virality analysis interface 226 can include a demographic panel that includes statistics involving the acting users associated with the social network nodes in the user activity cascade. In some embodiments, the virality analysis interface 226 can include a content summarization panel that includes insights from analyzing content (e.g., textual content or multimedia content) in content objects associated with the social network nodes in the user activity cascade. In some embodiments, the virality analysis interface 226 can include a prediction panel that includes a computed estimate of how the viral statistics would change going forward.

Figure 3:
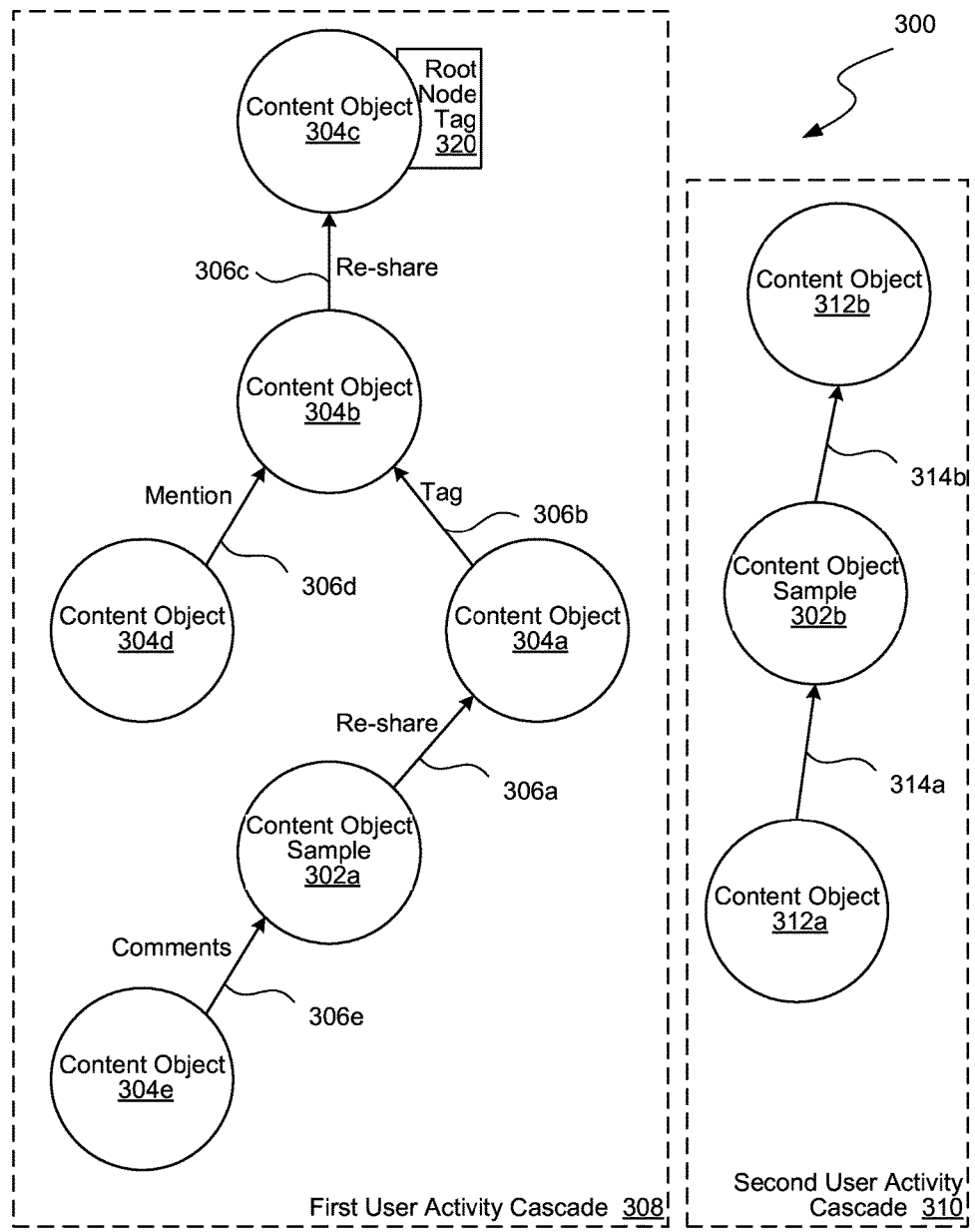
FIG. 3 is a graph diagram illustrating an example of a portion of a social graph for graph exploration by the graph exploration engine of FIG. 2.

FIG. 3 is a graph diagram illustrating an example of a portion of a social graph 300 for graph exploration by the graph exploration engine 206 of FIG. 2. The graph exploration engine can be seeded with a content object sample 302A and a content object sample 302B. For example, the graph exploration can be performed as a depth-first search or a breadth first search.

When the graph exploration engine is seeded with the content object sample 302A, the graph exploration engine can identify social network edges connected to the content object sample 302A. For example, the content object sample 302A can be connected to a content object 304A based on a social network edge 306A. In the illustrated example, the social network edge 306A represents a re-share action. That is, the content object 304A is a re-share/reposting of the content object sample 302A. If the graph exploration engine is configured to perform depth-first search, then the graph exploration engine would accordingly visit a social network edge 306B (e.g., a tagging activity) connecting the content object 304A to a content object 304B, then a social network edge 306C (e.g., a re-share action) connecting the content object 304B and a content object 304C, then a social network edge 306D (e.g., a mention action) connecting the content object 304B with a content object 304D, and then a social network edge 306E (e.g., a comment action) connecting the content object sample 302A with a content object 304E. In other examples, the social graph 300 can be explored in other orders. The social network edge 306A, the social network edge 306B, the social network edge 306C, the social network edge 306D, and the social network edge 306E can be collectively referred to as the "social network edges 306."

In the illustrated example, each of the social network edges has a directionality. In other examples, some or all of the social network edges lacks directionality. In some embodiments, the graph exploration engine is configured to explore only social network edges with directionality. In some embodiments, the graph exploration engine is configured to explore only social network edges with a particular directionality or lack of directionality. In some embodiments, the graph exploration engine is configured to explore in a particular direction first before exploring in another direction. In some embodiments, the graph exploration engine is configured to explore certain types of edges and/or certain types of nodes only.

When the graph exploration associated with the content object sample 302A finishes, the graph exploration engine can place the discovered social network nodes (e.g., the content object sample 302A, the content object 304A, the content object 304B, the content object 304C, the content object 304D, and the content object 304D) in a first user activity cascade 308. Based on the directionality of the social network edges 306, the graph exploration engine can also label a content object (e.g., the content object 304C) with a root node tag 320. For example, the roots node tag 320 labels the content object 304C as a source of viral propagation within the first user activity cascade 308.

In another example, when the graph exploration engine is seeded with the content object sample 302B, the graph exploration engine can identify social network edges connected to the content object sample 302B. For example, the content object sample 302B can be connected to a content object 312A via a social network edge 314A and a content object 312B via a social network edge 314B. When the graph exploration associated with the content object sample 302B finishes, the graph exploration engine can place the discovered social network nodes (e.g., the content object sample 302B, the content object 312A, and the content object 312B) in a second user activity cascade 310.

In some embodiments, a cascade combination engine (e.g., the cascade combination engine 216 of FIG. 2) computes similarities between the first user activity cascade 308 and the second user activity cascade 310. When the similarities are within a predetermined threshold, the cascade combination engine can merge the first user activity cascade 308 and the second user activity cascade 310. After the merging, the cascade combination engine can select a single root node for the merged cascade. For example, because the first user activity cascade 308 is bigger than the second user activity cascade 310 and/or because the root node of the first user activity cascade 308 is created earlier than the root node of the second user activity cascade 310, the first user activity cascade 308's root node can be selected as the root node of the merged cascade.

Figure 4:
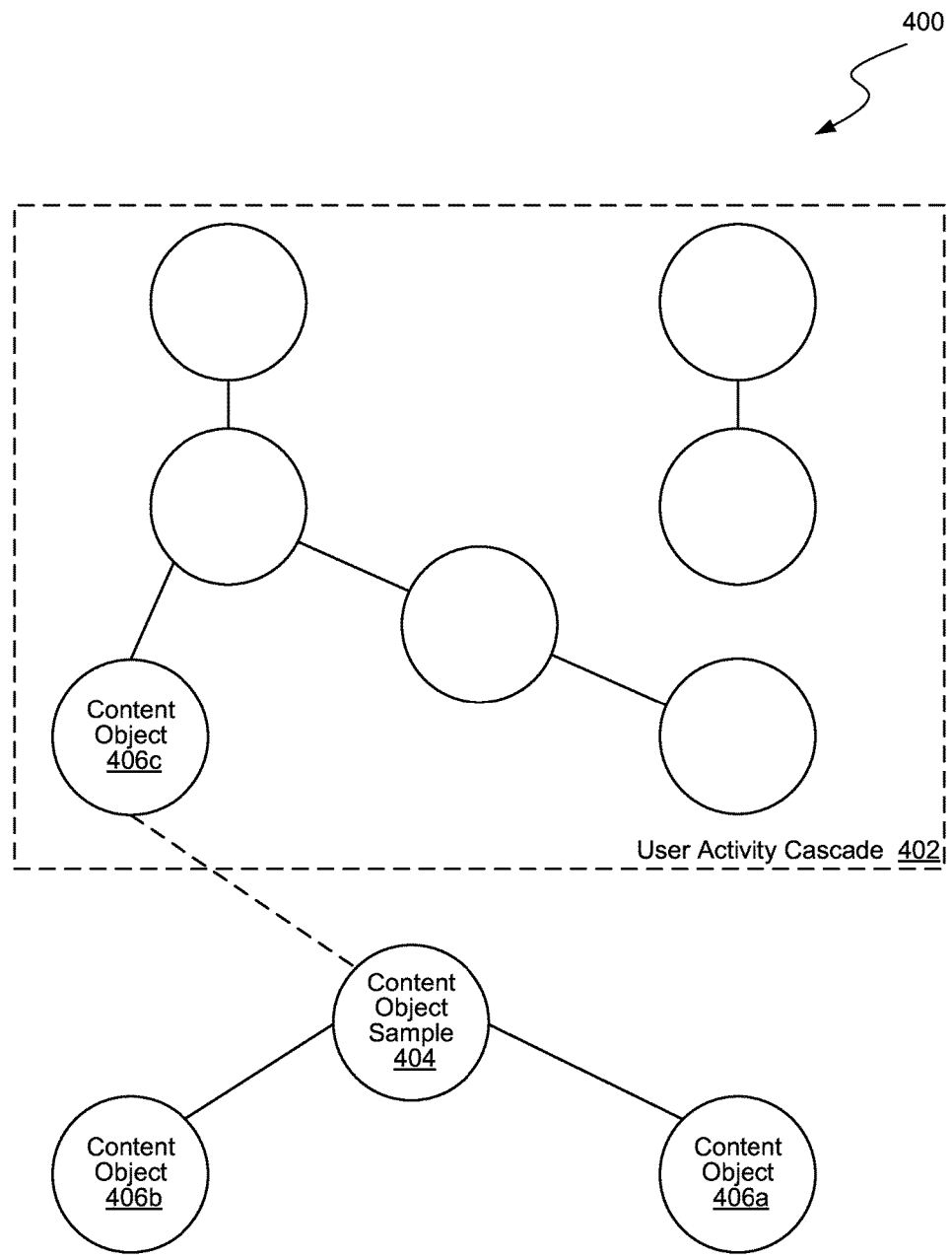
FIG. 4 is a graph diagram illustrating another example of a portion of a social graph for graph exploration by the graph exploration engine of FIG. 2.

FIG. 4 is a graph diagram illustrating another example of a portion of a social graph 400 for graph exploration by the graph exploration engine 206 of FIG. 2. The social graph 400 can include a user activity cascade 402 already monitored by the graph exploration engine. The graph exploration engine can be seeded with a content object sample 404. Similar to the illustration of FIG. 3, the graph exploration engine can explore social network edges connected to the content object sample 404 to identify connected social network nodes (e.g., a content object 406A, a content object 406B, and a content object 406C). However, because the content object 406C is already part of the user activity cascade 402, the graph exploration does not produce a new user activity cascade. Instead, the content object sample 404, the content object 406A, and the content object 406B are added to the user activity cascade 402. In some embodiments, the graph exploration ends when the content object 406C is discovered to belong to the user activity cascade 402. In some embodiments, the graph exploration continues on in all other directions except connections of the content object 406C. In these embodiments, the later discovered social network nodes are also added to the user activity cascade 402.

Figure 5:
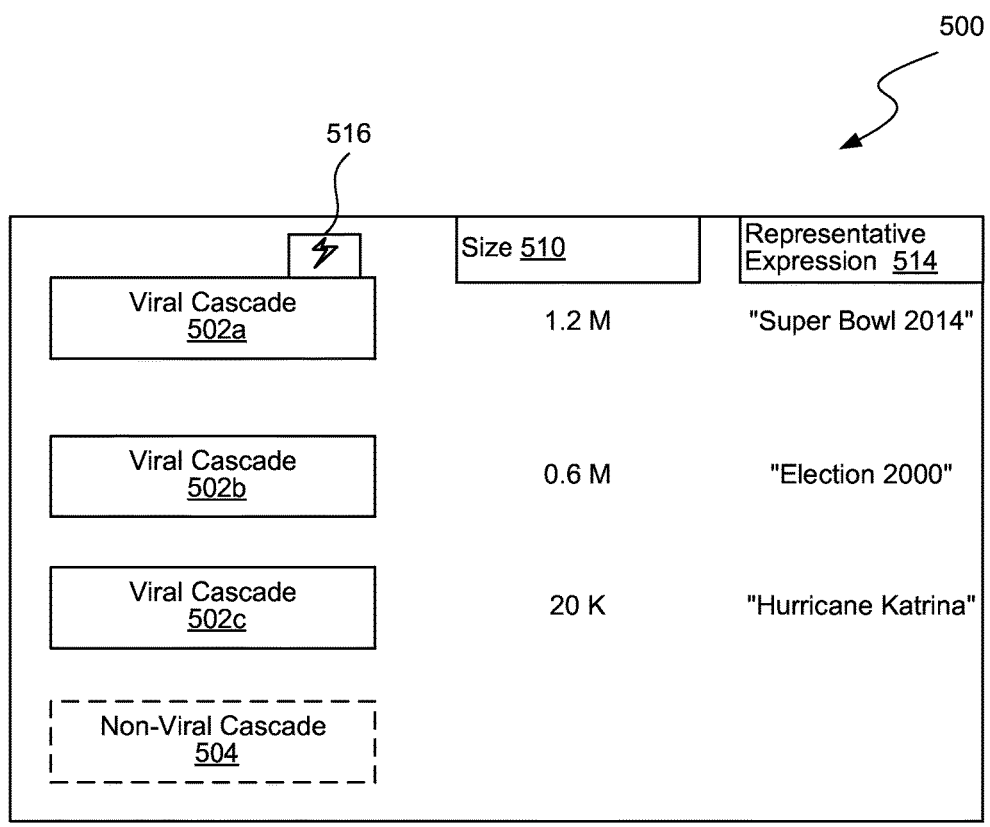
FIG. 5 is an example of a virality analysis interface displaying a cascade summary window, in accordance with various embodiments.

FIG. 5 is an example of a virality analysis interface displaying a cascade summary window 500, in accordance with various embodiments. The cascade summary window 500 can display user activity cascades determined to be virally propagating. For example, the cascade summary window 500 can display viral cascades (e.g., a viral cascade 502A, a viral cascade 502B, and a viral cascade 502C, collectively as the "viral cascades 502"). The cascade summary window 500 can also display at least a non-viral cascade 504. The viral cascades are user activity cascades produced from a graph exploration engine (e.g., the graph exploration engine of FIG. 2) and tagged as being virally propagating by a virality determination engine (e.g., the virality determination engine 214 of FIG. 2). The non-viral cascade 504 can be a user activity cascade produced from the graph exploration engine but not yet determined as virally propagating by the virality determination engine. However, the virality determination engine may determine otherwise at a later time.

In some embodiments, when the graph exploration engine is seeded with an additional sample content object, the graph exploration engine may discover new nodes to add to the non-viral cascade 504. When enough additional social network nodes are added to the non-viral cascade 504, the virality determination engine may deem the non-viral cascade 504 large enough to be "virally propagating."

In some embodiments, when the graph exploration engine is seeded with an additional sample content object, the graph exploration engine may discover a new user activity cascade that is similar to the non-viral cascade 504. A cascade combination engine (e.g., the cascade combination engine 216 of FIG. 2) may merge the new user activity cascade with the non-viral cascade 504. The virality determination engine may deem the new user activity cascade alone to be "virally propagating," and thus the merged cascade to be virally propagating as well. The virality determination engine may deem neither the new user activity cascade nor the non-viral cascade 504 to be virally propagating, but the merged cascade as virally propagating.

The cascade summary window 500 can display additional information about each of the viral cascades 502. For example, the cascade summary window 500 can include a size column 510 describing the size of each of the viral cascades 502. The size column 510 provides, for example, the number of social network nodes in each cascade. In another example, the virality analysis interface can include a representative expression column 514. The representative expression column 514 provides, for example, a conceptual summary of what the members of each cascade represent. For example the viral cascade 502A may have a representative expression of "Super Bowl 2014." In some embodiments, the representative expression is a title as specified by an operating user of the virality analysis interface 500. In some embodiments, the representative expression is defined when the viral propagation study is initiated and defined.

In some embodiments, the cascade summary window 500 can label one of the viral cascades 502 with a trending tag 516. The trending tag 516 of a viral cascade can denote a potential change to the viral cascade beyond a pre-defined threshold. For example, the trending tag 516 can denote that the viral cascade is predicted to expand in size (e.g., number of user activities, number of content objects, and/or number of engaged users) by two folds. The trending tag 516 can be used to warn analyst users or application services of a pending increase or decrease of public exposure and/or information technology (IT) professionals or automated maintenance services of a pending increase or decrease in network traffic.

Figure 6:
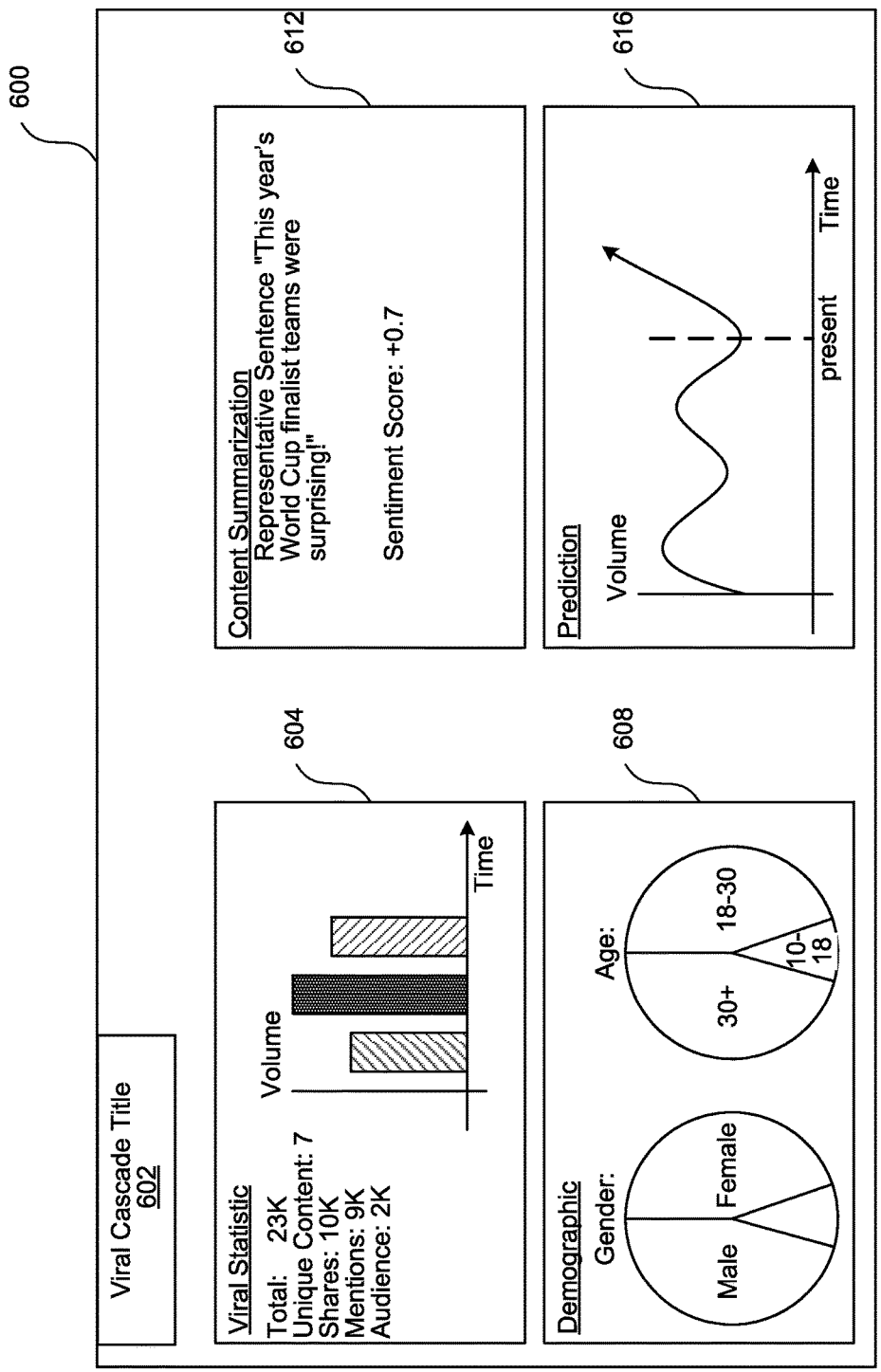
FIG. 6 is an example of a virality analysis interface displaying a virality insight window, in accordance with various embodiments.

FIG. 6 is an example of a virality analysis interface displaying a virality insight window 600, in accordance with various embodiments. The virality insight window 600 can include a viral cascade title 602 indicating the name of a viral cascade that is the subject of the virality insight window 600.

The virality insight window 600 can include a viral statistic panel 604 that illustrates statistics involving the viral cascade. For example, the viral statistic panel 604 can display attributes used by a virality determination engine to determine whether the viral cascade is virally propagating. In the illustrated example, the viral statistic panel 604 includes a total number of social network nodes in the viral cascade, a number of unique content objects in the viral cascade, a number of re-share activities in the viral cascade, a number of "mentions" (e.g., explicit tagging of relevant content objects in user-generated posts or status updates), and a number of unique users involved in user activities in the viral cascade. In some embodiments, the viral statistic panel 604 can include a visualization of one or more of the statistics.

In some embodiments, the virality insight window 600 can include a demographic panel 608 that includes statistics involving the acting users associated with social network nodes in the viral cascade. The demographic panel 608 can include absolute counts of different categories of the acting users or proportional distributions (e.g., percentages) of the different categories. In the illustrated example, the demographic panel 608 includes a visualization showing the gender distribution of the acting users and a visualization showing the age distribution of the acting users.

In some embodiments, the virality insight window 600 can include a content summarization panel 612 that includes insights from analyzing content (e.g., textual content, image content, audio content, video content, or other multimedia content) in content objects associated with the social network nodes in the viral cascade. The content summarization panel 612 can include a representative sentence or expression derived from the content objects. The content summarization panel 612 can present a common sentiment (e.g., a rating of a positive sentiment or a negative sentiment) from the content objects. The content summarization panel 612 can also present a measure of the coherence of the sentiments or key terms present in the content objects (e.g., how often do the content objects use the same key terms or have the same sentiment).

In some embodiments, the virality insight window 600 can include a prediction panel 616 that includes a computed estimate of how the viral statistics would change going forward. For example, the prediction panel 616 can display a graph showing historical evolution of a statistical measure (e.g., volume) associated with the viral cascade and the projected trend of the statistical measure in the near future.

Figure 7:
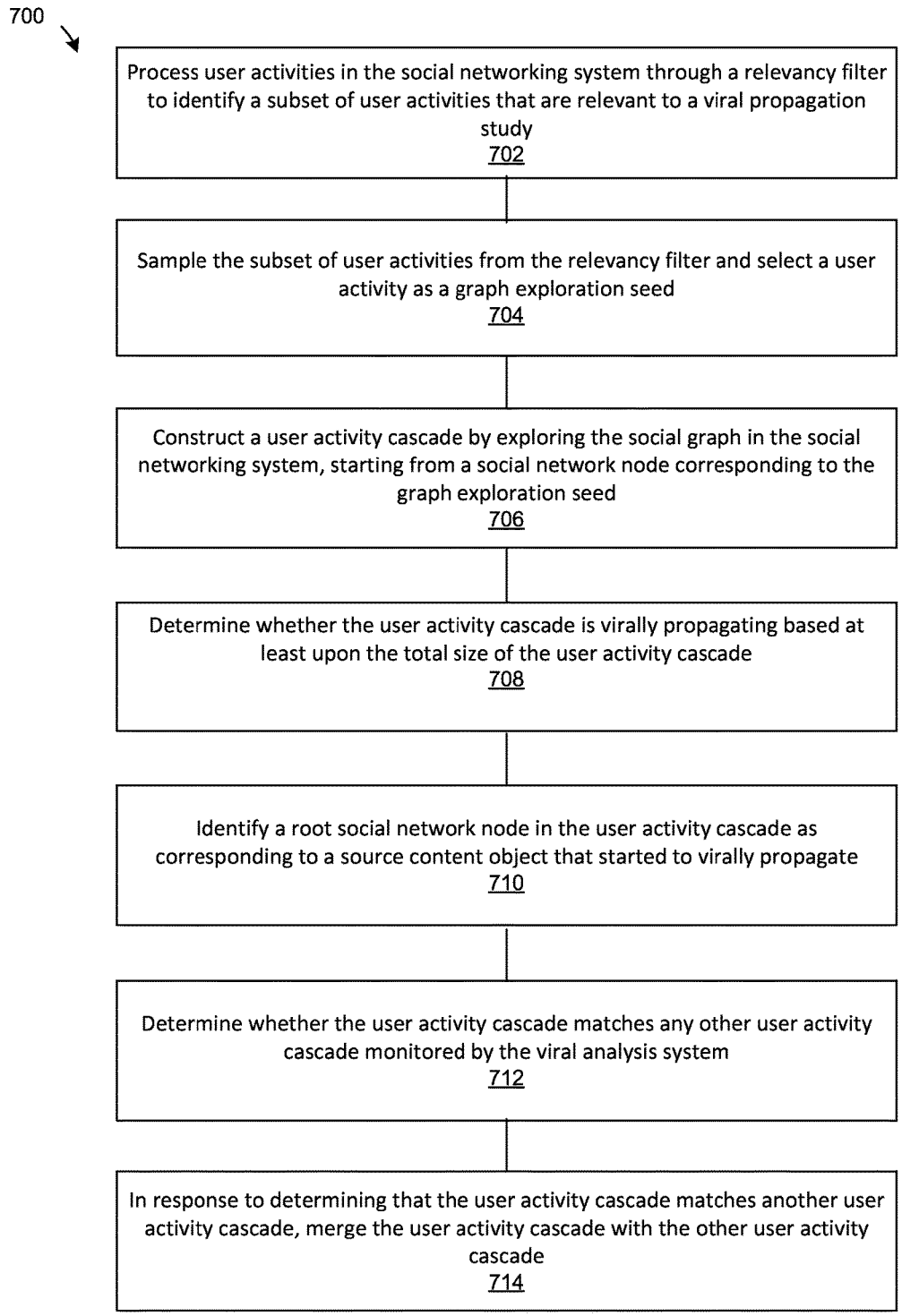
FIG. 7 is a flow chart illustrating a method of operating a virality analysis system to identify virally propagating content in a social networking system, in accordance with various embodiments.

FIG. 7 is a flow chart illustrating a method of operating a virality analysis system (e.g., the virality analysis system 200 of FIG. 2) to identify virally propagating content in a social networking system (e.g., the social networking system 100 of FIG. 1 or the social networking system 902 of FIG. 9), in accordance with various embodiments. The virality analysis system can be part of the social networking system.

At step 702, the virality analysis system can process user activities in the social networking system through a relevancy filter to identify a subset of user activities that are relevant to a viral propagation study. In one example, a user activity is initiated by a user account. The user activity can involve a user-generated content object. Processing the user activity through the relevancy filter can involve utilizing the relevancy filter to determine whether a profile attribute of the user account is relevant to the viral propagation study. Processing the user activity through the relevancy filter can involve utilizing the relevancy filter to determine whether the user-generated content object is relevant to the viral propagation study. The user activity can include a metadata tag (e.g., timestamp, geographical location tag, etc.). Processing the user activity through the relevancy filter can involve utilizing the relevancy filter to determine whether the metadata tag satisfies a relevant category (e.g., a time window or a spatial region).

In some embodiments, at step 704, the virality analysis system samples the subset of user activities from the relevancy filter, wherein said sampling includes selecting a user activity as a graph exploration seed. The virality analysis system can sample at a sampling rate corresponding to a threshold confidence level beyond which a target social network node containing relevant content is unlikely to be sampled within a social network cascade of connected social network nodes that are connected to one another by a common non-relevant concept. In one example, the virality analysis system can receive a new user activity submitted to the social networking system, confirmed that it is relevant, and then run it through a sampling filter to see if the user activity is to be used as the graph exploration seed.

At step 706, the virality analysis system can construct a user activity cascade by exploring the social graph in the social networking system, starting from a social network node corresponding to the user activity selected as the graph exploration seed. In one example, the graph exploration is in response to selecting the user activity as the graph exploration seed. In another example, the graph exploration is in response to identifying the user activity as being relevant to the viral propagation study. The user activity cascade can comprise social network nodes found during the graph exploration. In some embodiments, while exploring the social graph, the virality analysis system can increase a counter of the total size of the user activity cascade whenever a new node is found.

In some embodiments, the virality analysis system can explore social network edges corresponding specifically to one or more social connection types. For example, the social connection types can include a content sharing edge describing a first social networking node being a re-share of a second social networking node. In some embodiments, the virality analysis system can explore social network nodes corresponding specifically to one or more social network node types. For example, the graph exploration can involve only content publication activities (e.g., user posts, comments, photo shares, link shares, status updates, or any combination thereof).

The graph exploration can terminate on one or more stop conditions. For example, the graph exploration can terminate when no more social network node is found or when a target social network node is detected as being part of another user activity cascade monitored by the viral analysis system.

At step 708, the virality analysis system can determine whether the user activity cascade is virally propagating based at least upon the total size of the user activity cascade. For example, the virality analysis system can count a number of social network nodes in the user activity cascade corresponding to user activities within a time window as a basis for determining whether the user activity cascade is virally propagating.

In some embodiments, at step 710, the virality analysis system can identify a root social network node in the user activity cascade as corresponding to a source content object that started to virally propagate. The virality analysis system can identify the root network node by exploring the social graph along one direction through directional social network edges until no further social network node is found.

At step 712, the virality analysis system can determine whether the user activity cascade matches (e.g., is similar to) any other user activity cascade monitored by the viral analysis system. For example, the virality analysis system can compare a first set of content objects involved in the user activity cascade against a second set of content objects involved in the other user activity cascade. For example, the comparison can involve a comparison of titles, links, comments, content text, images, or any combination thereof. Prior to the comparison, the virality analysis system can translate at least a portion of the first set of content objects or a portion of the second set of content objects to utilize a single language for comparison. At step 714, in response to determining that the user activity cascade matches another user activity cascade, the virality analysis system can merge the user activity cascade with the other user activity cascade.

In some embodiments, the virality analysis system monitors one or more non-viral cascades (e.g., that are not labeled as virally propagating). These non-viral cascades can remain in a database of the virality analysis system. A new user activity can seed additional graph exploration that expands one of the non-viral cascades. Further, step 714 can merge a non-viral cascade with another user activity cascade, and thus making the combined cascade large enough to be deemed virally propagating.

In some embodiments, the virality analysis system can double check the relevancy of a user activity cascade relative to the viral propagation study. While the relevancy filter identifies a graph exploration seed only when the graph exploration seed is relevant, it is possible that a user activity cascade, produced from the graph exploration that is seeded with a relevant user activity, can include a majority of non-relevant content. This can occur when a relevant user activity happens to be associated with a bunch of non-relevant user activities. Accordingly, the virality analysis system can further examine social network nodes (and associated acting users and content objects) in the user activity cascade to determine whether the majority of the social network nodes are relevant. In some embodiments, the virality analysis system can sample only a subset of the social network nodes for examination.

Figure 8:
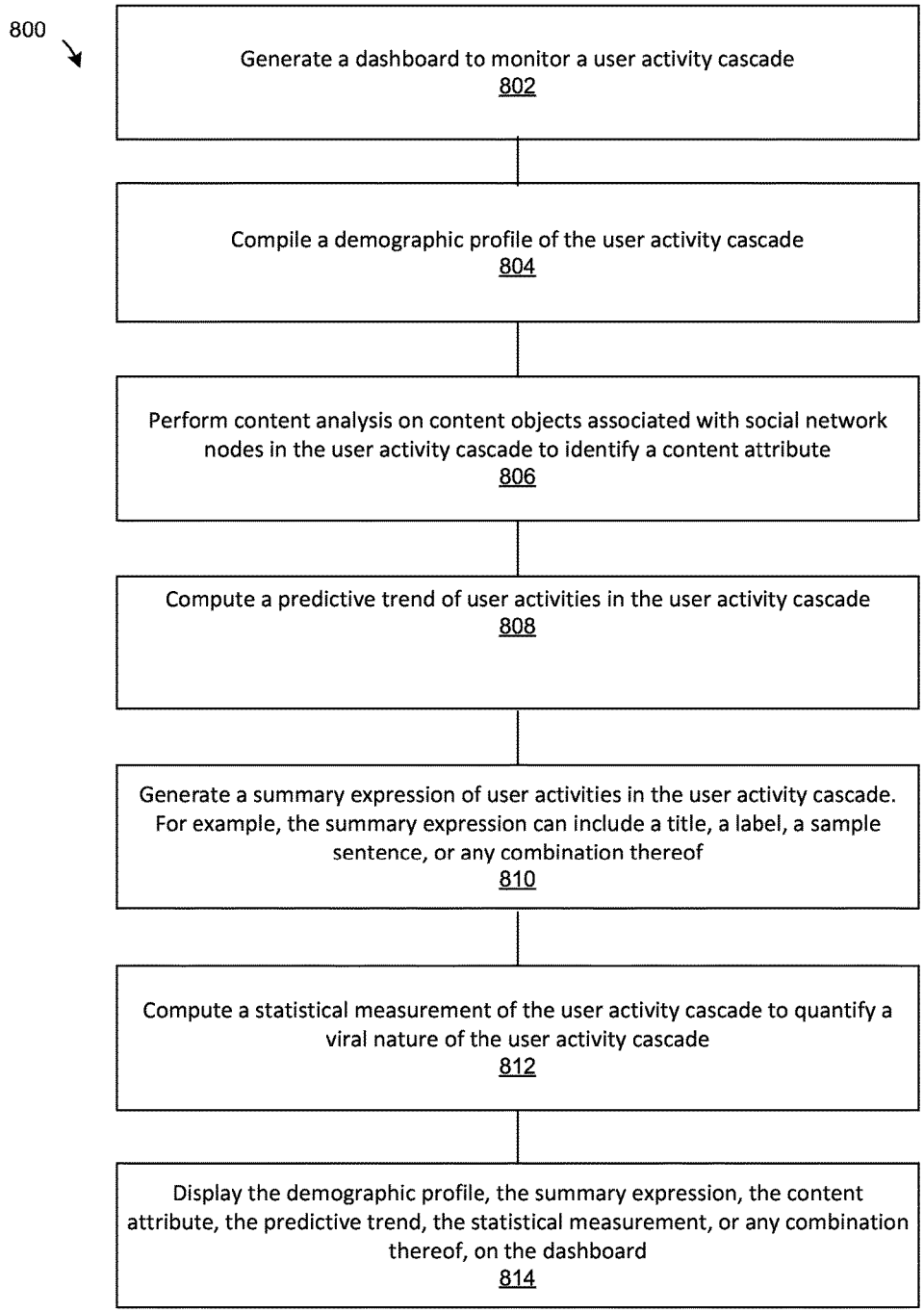
FIG. 8 is a flow chart illustrating a method of operating a virality analysis system to analyze user activity cascades corresponding to virally propagating content in a social networking system, in accordance with various embodiments.

FIG. 8 is a flow chart illustrating a method 800 of operating a virality analysis system to analyze user activity cascades corresponding to virally propagating content in a social networking system, in accordance with various embodiments. At step 802, the virality analysis system can generate a dashboard to monitor a user activity cascade. At step 804, the virality analysis system can compile a demographic profile (e.g., a statistical distribution of acting users) of the user activity cascade. At step 806, the virality analysis system can perform content analysis on content objects associated with social network nodes in the user activity cascade to identify a content attribute. For example, the content attribute can include a sentiment, an association with a meme, theme, concept, or topic, a coherence factor (e.g., how similar the content objects are from each other), or any combination thereof.

At step 808, the virality analysis system can compute a predictive trend of user activities in the user activity cascade. For example, a machine learning predictive model can be used to compute the predictive trend. The predictive model can be trained based on historical data (e.g., using features of a user activity cascade to estimate actual changes to the user activity cascade). The machine learning predictive model can then be updated and re-trained periodically. At step 810, the virality analysis system can generate a summary expression of user activities in the user activity cascade. For example, the summary expression can include a title, a link, a label, a sample sentence, or any combination thereof. At step 812, the virality analysis system can compute a statistical measurement of the user activity cascade to quantify a viral nature of the user activity cascade. At step 814, the virality analysis system can display the demographic profile, the summary expression, the content attribute, the predictive trend, the statistical measurement, or any combination thereof, on the dashboard. In some embodiments, the virality analysis system can provide the predictive trend to an application service of the social networking system.

While processes or blocks are presented in a given order in this disclosure, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation. A process step is "in response to" to another process step when the process step is a direct reaction to the completion of the others process step.

FIG. 9 is a high-level block diagram of a system environment 900 suitable for a social networking system 902, in accordance with various embodiments. The system environment 900 shown in FIG. 9 includes the social networking system 902 (e.g., the social networking system 100 of FIG. 1), a client device 904A, and a network channel 906. The system environment 900 can include other client devices as well, e.g., a client device 904B and a client device 904C. In other embodiments, the system environment 900 may include different and/or additional components than those shown by FIG. 9. The virality analysis system 200 of FIG. 2 can be implemented in the social networking system 902.

Social Networking System Environment and Architecture

The social networking system 902, further described below, comprises one or more computing devices storing user profiles associated with users (i.e., social networking accounts) and/or other objects as well as connections between users and other users and/or objects. Users join the social networking system 902 and then add connections to other users or objects of the social networking system to which they desire to be connected. Users of the social networking system 902 may be individuals or entities, e.g., businesses, organizations, universities, manufacturers, etc. The social networking system 902 enables its users to interact with each other as well as with other objects maintained by the social networking system 902. In some embodiments, the social networking system 902 enables users to interact with third-party websites and a financial account provider.

Based on stored data about users, objects and connections between users and/or objects, the social networking system 902 generates and maintains a "social graph" comprising multiple nodes interconnected by multiple edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 902 adds and/or modifies edges connecting the various nodes to reflect the interactions.

The client device 904A is a computing device capable of receiving user input as well as transmitting and/or receiving data via the network channel 906. In at least one embodiment, the client device 904A is a conventional computer system, e.g., a desktop or laptop computer. In another embodiment, the client device 904A may be a device having computer functionality, e.g., a personal digital assistant (PDA), mobile telephone, a tablet, a smart-phone or similar device. In yet another embodiment, the client device 904A can be a virtualized desktop running on a cloud computing service. The client device 904A is configured to communicate with the social networking system 902 via a network channel 906 (e.g., an intranet or the Internet). In at least one embodiment, the client device 904A executes an application enabling a user of the client device 904A to interact with the social networking system 902. For example, the client device 904A executes a browser application to enable interaction between the client device 904A and the social networking system 902 via the network channel 906. In another embodiment, the client device 904A interacts with the social networking system 902 through an application programming interface (API) that runs on the native operating system of the client device 904A, e.g., IOS® or ANDROID™.

The client device 904A is configured to communicate via the network channel 906, which may comprise any combination of local area and/or wide area networks, using both wired and wireless communication systems. In at least one embodiment, the network channel 906 uses standard communications technologies and/or protocols. Thus, the network channel 906 may include links using technologies, e.g., Ethernet, 802.11, worldwide interoperability for microwave access (WiMAX), 3G, 4G, CDMA, digital subscriber line (DSL), etc. Similarly, the networking protocols used on the network channel 906 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network channel 906 may be represented using technologies and/or formats including hypertext markup language (HTML) or extensible markup language (XML). In addition, all or some of links can be encrypted using conventional encryption technologies, e.g., secure sockets layer (SSL), transport layer security (TLS), and Internet Protocol security (IPsec).

The social networking system 902 includes a profile store 910, a content store 912, an action logger 914, an action log 916, an edge store 918, a web server 924, a message server 926, an application service interface (API) request server 928, a virality analysis system 932, a topic tagger engine 934, an image tagger engine 936, a relevant activity tracker 938, or any combination thereof. In other embodiments, the social networking system 902 may include additional, fewer, or different modules for various applications.

User of the social networking system 902 can be associated with a user profile, which is stored in the profile store 910. The user profile is associated with a social networking account. A user profile includes declarative information about the user that was explicitly shared by the user, and may include profile information inferred by the social networking system 902. In some embodiments, a user profile includes multiple data fields, each data field describing one or more attributes of the corresponding user of the social networking system 902. The user profile information stored in the profile store 910 describes the users of the social networking system 902, including biographic, demographic, and other types of descriptive information, e.g., work experience, educational history, gender, hobbies or preferences, location and the like. A user profile may also store other information provided by the user, for example, images or videos. In some embodiments, images of users may be tagged with identification information of users of the social networking system 902 displayed in an image. A user profile in the profile store 910 may also maintain references to actions by the corresponding user performed on content items (e.g., items in the content store 912) and stored in the edge store 918 or the action log 916.

A user profile may be associated with one or more financial accounts, enabling the user profile to include data retrieved from or derived from a financial account. In some embodiments, information from the financial account is stored in the profile store 910. In other embodiments, it may be stored in an external store.

A user may specify one or more privacy settings, which are stored in the user profile, that limit information shared through the social networking system 902. For example, a privacy setting limits access to cache appliances associated with users of the social networking system 902.

The content store 912 stores content items (e.g., images, videos, or audio files) associated with a user profile. The content store 912 can also store references to content items that are stored in an external storage or external system. Content items from the content store 912 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social networking system by displaying content related to users, objects, activities, or functionalities of the social networking system 902. Examples of social networking content items include suggested connections or suggestions to perform other actions, media provided to, or maintained by, the social networking system 902 (e.g., pictures or videos), status messages or links posted by users to the social networking system, events, groups, pages (e.g., representing an organization or commercial entity), and any other content provided by, or accessible via, the social networking system.

The content store 912 also includes one or more pages associated with entities having user profiles in the profile store 910. An entity can be a non-individual user of the social networking system 902, e.g., a business, a vendor, an organization, or a university. A page includes content associated with an entity and instructions for presenting the content to a social networking system user. For example, a page identifies content associated with the entity's user profile as well as information describing how to present the content to users viewing the brand page. Vendors may be associated with pages in the content store 912, enabling social networking system users to more easily interact with the vendor via the social networking system 902. A vendor identifier is associated with a vendor's page, thereby enabling the social networking system 902 to identify the vendor and/or to retrieve additional information about the vendor from the profile store 910, the action log 916 or from any other suitable source using the vendor identifier. In some embodiments, the content store 912 may also store one or more targeting criteria associated with stored objects and identifying one or more characteristics of a user to which the object is eligible to be presented.

The action logger 914 receives communications about user actions on and/or off the social networking system 902, populating the action log 916 with information about user actions. Such actions may include, for example, adding a connection to another user, sending a message to another user, uploading an image, reading a message from another user, viewing content associated with another user, attending an event posted by another user, among others. In some embodiments, the action logger 914 receives, subject to one or more privacy settings, content interaction activities associated with a user. In addition, a number of actions described in connection with other objects are directed at particular users, so these actions are associated with those users as well. These actions are stored in the action log 916.

In accordance with various embodiments, the action logger 914 is capable of receiving communications from the web server 924 about user actions on and/or off the social networking system 902. The action logger 914 populates the action log 916 with information about user actions to track them. This information may be subject to privacy settings associated with the user. Any action that a particular user takes with respect to another user is associated with each user's profile, through information maintained in a database or other data repository, e.g., the action log 916. Such actions may include, for example, adding a connection to the other user, sending a message to the other user, reading a message from the other user, viewing content associated with the other user, attending an event posted by another user, being tagged in photos with another user, liking an entity, etc.

The action log 916 may be used by the social networking system 902 to track user actions on the social networking system 902, as well as external website that communicate information to the social networking system 902. Users may interact with various objects on the social networking system 902, including commenting on posts, sharing links, and checking-in to physical locations via a mobile device, accessing content items in a sequence or other interactions. Information describing these actions is stored in the action log 916. Additional examples of interactions with objects on the social networking system 902 included in the action log 916 include commenting on a photo album, communications between users, becoming a fan of a musician, adding an event to a calendar, joining a groups, becoming a fan of a brand page, creating an event, authorizing an application, using an application and engaging in a transaction. Additionally, the action log 916 records a user's interactions with advertisements on the social networking system 902 as well as applications operating on the social networking system 902. In some embodiments, data from the action log 916 is used to infer interests or preferences of the user, augmenting the interests included in the user profile, and enabling a more complete understanding of user preferences.

Further, user actions that happened in particular context, e.g., when the user was shown or was seen accessing particular content on the social networking system 902, can be captured along with the particular context and logged. For example, a particular user could be shown/not-shown information regarding candidate users every time the particular user accessed the social networking system 902 for a fixed period of time. Any actions taken by the user during this period of time are logged along with the context information (i.e., candidate users were provided/not provided to the particular user) and are recorded in the action log 916. In addition, a number of actions described below in connection with other objects are directed at particular users, so these actions are associated with those users as well.

The action log 916 may also store user actions taken on external websites services associated with the user. The action log 916 records data about these users, including viewing histories, advertisements that were engaged, purchases or rentals made, and other patterns from content requests and/or content interactions.

In some embodiments, the edge store 918 stores the information describing connections between users and other objects on the social networking system 902 in edge objects. The edge store 918 can store the social graph described above. Some edges may be defined by users, enabling users to specify their relationships with other users. For example, users may generate edges with other users that parallel the users' real-life relationships, e.g., friends, co-workers, partners, and so forth. Other edges are generated when users interact with objects in the social networking system 902, e.g., expressing interest in a page or a content item on the social networking system, sharing a link with other users of the social networking system, and commenting on posts made by other users of the social networking system. The edge store 918 stores edge objects that include information about the edge, e.g., affinity scores for objects, interests, and other users. Affinity scores may be computed by the social networking system 902 over time to approximate a user's affinity for an object, interest, and other users in the social networking system 902 based on the actions performed by the user. Multiple interactions of the same type between a user and a specific object may be stored in one edge object in the edge store 918, in at least one embodiment. In some embodiments, connections between users may be stored in the profile store 910. In some embodiments, the profile store 910 may reference or be referenced by the edge store 918 to determine connections between users. Users may select from predefined types of connections, or define their own connection types as needed.

The web server 924 links the social networking system 902 via a network to one or more client devices; the web server 924 serves web pages, as well as other web-related content, e.g., Java, Flash, XML, and so forth. The web server 924 may communicate with the message server 926 that provides the functionality of receiving and routing messages between the social networking system 902 and client devices. The messages processed by the message server 926 can be instant messages, email messages, text and SMS (short message service) messages, photos, or any other suitable messaging technique. In some embodiments, a message sent by a user to another user can be viewed by other users of the social networking system 902, for example, by the connections of the user receiving the message. An example of a type of message that can be viewed by other users of the social networking system besides the recipient of the message is a wall post. In some embodiments, a user can send a private message to another user that can only be retrieved by the other user.

The API request server 928 enables external systems to access information from the social networking system 902 by calling APIs. The information provided by the social network may include user profile information or the connection information of users as determined by their individual privacy settings. For example, a system interested in predicting the probability of users forming a connection within a social networking system may send an API request to the social networking system 902 via a network. The API request server 928 of the social networking system 902 receives the API request. The API request server 928 processes the request by determining the appropriate response, which is then communicated back to the requesting system via a network.

The virality analysis system 932 can be the virality analysis system 112 of FIG. 1. The virality analysis system 932 can enable analyst users to define, modify, track, execute, compare, analyze, evaluate, and/or deploy one or more viral propagation studies. The relevant activity tracker 938 can classify user activities (e.g., tracked by the action logger 914) in the social networking system 902 as being relevant to at least one viral propagation study. The relevant activity tracker 938 can filter user activities as potentials to be a graph exploration seed. The virality analysis system 932 can perform graph exploration based on at least a subset of relevant user activities to generate user activity cascades representing virally propagating subject matters in the social networking system 902.

The topic tagger engine 934 can analyze text strings within the content objects in the content store 912 to produce a reference to a social network page. The image tagger engine 936 can analyze multimedia objects within the content objects in the content store 912 to produce a reference to a social network page. The concept study system 932 can make use of the references (e.g., topic tags) produced from the topic tagger engine 934 or the image tagger engine 936 to classify user activities for concept studies.

Functional components (e.g., circuits, devices, engines, modules, and data storages, etc.) associated with the social networking system 100 of FIG. 1, the virality analysis system 200 of FIG. 2, and/or the social networking system 902 of FIG. 9, can be implemented as a combination of circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). The systems, engines, or devices described may include additional, fewer, or different functional components for various applications.

Figure 10:
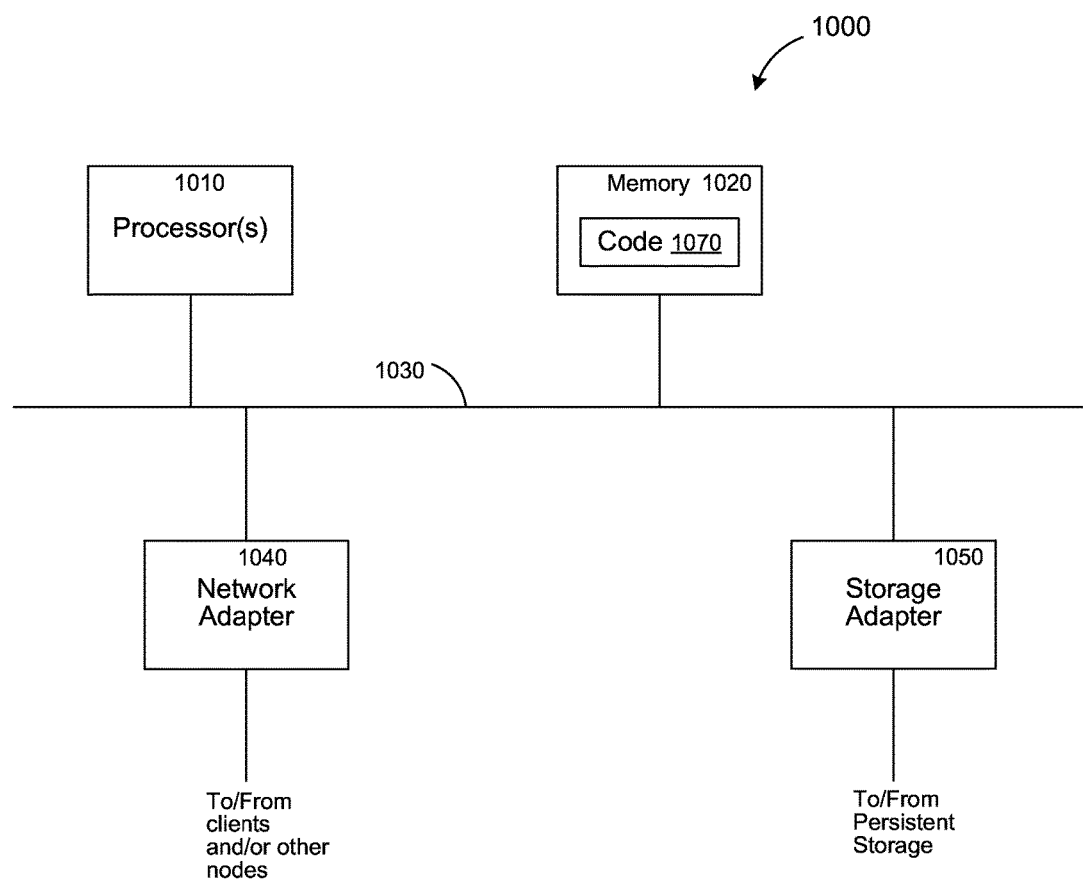
FIG. 10 is a block diagram of an example of a computing device, which may represent one or more computing device or server described herein, in accordance with various embodiments.

FIG. 10 is a block diagram of an example of a computing device 1000, which may represent one or more computing device or server described herein, in accordance with various embodiments. The computing device 1000 can be one or more computing devices that implement the social networking system 100 of FIG. 1 and/or the virality analysis system 200 of FIG. 2. The computing device 1000 can execute at least part of the method 700 of FIG. 7 and/or the method 800 of FIG. 8. The computing device 1000 includes one or more processors 1010 and memory 1020 coupled to an interconnect 1030. The interconnect 1030 shown in FIG. 10 is an abstraction that represents any one or more separate physical buses, point-to-point connections, or both connected by appropriate bridges, adapters, or controllers. The interconnect 1030, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 1010 is/are the central processing unit (CPU) of the computing device 1000 and thus controls the overall operation of the computing device 1000. In certain embodiments, the processor(s) 1010 accomplishes this by executing software or firmware stored in memory 1020. The processor(s) 1010 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1020 is or includes the main memory of the computing device 1000. The memory 1020 represents any form of random access memory (RAM), read-only memory (ROM), flash memory, or the like, or a combination of such devices. In use, the memory 1020 may contain a code 1070 containing instructions according to the mesh connection system disclosed herein.

Also connected to the processor(s) 1010 through the interconnect 1030 are a network adapter 1040 and a storage adapter 1050. The network adapter 1040 provides the computing device 1000 with the ability to communicate with remote devices, over a network and may be, for example, an Ethernet adapter or Fibre Channel adapter. The network adapter 1040 may also provide the computing device 1000 with the ability to communicate with other computers. The storage adapter 1050 enables the computing device 1000 to access a persistent storage, and may be, for example, a Fibre Channel adapter or SCSI adapter.

The code 1070 stored in memory 1020 may be implemented as software and/or firmware to program the processor(s) 1010 to carry out actions described above. In certain embodiments, such software or firmware may be initially provided to the computing device 1000 by downloading it from a remote system through the computing device 1000 (e.g., via network adapter 1040).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; and/or optical storage media; flash memory devices), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments. Reference in this specification to where a result of an action is "based on" another element or feature means that the result produced by the action can change depending at least on the nature of the other element or feature.

What is claimed is:

1. A computer-implemented method for improving computer-implemented content selection, the method comprising:
processing user activities in a social networking system through a relevancy filter to identify a subset of user activities that are relevant to a viral propagation study;
in response to selecting a user activity as the graph exploration seed, constructing a user activity cascade by exploring a social graph in the social networking system, starting from a starter social network node corresponding to the selected user activity, wherein the user activity cascade comprises social network nodes found during said exploring; and
determining that the user activity cascade is virally propagating, wherein the determining improves computer-implemented content selection and wherein the determining is based on one or more of: a total size of the user activity cascade, an expansion rate of the user activity cascade, a diversity measure of the user activity cascade, or any combination thereof;
wherein, one or more of:
said exploring the social graph includes exploring one or more social network nodes connected to one or more already explored social network nodes via one or more social network edges and wherein the social network edges correspond to one or more specific social connection types;
said determining that the user activity cascade is virally propagating includes counting a number of social network nodes in the user activity cascade corresponding to user activities within a time window;
said exploring includes exploring one or more social network nodes connected via directional social network edges, and wherein identifying the root network node includes exploring the social graph along one of the directions until no further social network node is found;
the method further comprises:
determining whether the user activity cascade is similar to another user activity cascade being monitored by a viral analysis system; and
in response to determining that the user activity cascade is similar to the other user activity cascade, merging the user activity; or
any combination thereof.

2. The computer-implemented method of claim 1, wherein said processing the user activities includes confirming a newly submitted user activity in the social networking system is relevant via the relevancy filter; and wherein the method includes sampling the subset of user activities from the relevancy filter by, in response to confirming the newly submitted user activity is relevant, determining whether to select the newly submitted user activity as the graph exploration seed according to a random or periodic determination.

3. The computer-implemented method of claim 1, wherein the one or more specific social connection types include a content sharing edge type that describes a first social networking node being a re-share of a second social networking node.

4. The computer-implemented method of claim 1, wherein said exploring stops when no more social network node is found or when a social network node is detected as being part of another user activity cascade being monitored by a viral analysis system.

5. The computer-implemented method of claim 1, wherein said exploring includes exploring only one or more social network nodes corresponding to content publication activities.

6. The computer-implemented method of claim 1, further comprising identifying a root social network node in the user activity cascade as corresponding to a source content object that started to virally propagate.

7. The computer-implemented method of claim 1, wherein said determining whether the user activity cascade is similar to the other user activity cascade includes comparing a first set of content objects involved in the user activity cascade against a second set of content objects involved in the other user activity Cascade in terms of overlap in title, links, comments, content text, images, or any combination thereof.

8. The computer-implemented method of claim 7, wherein said comparing includes translating at least a portion of the first set of content objects or a portion of the second set of content objects to utilize a single language for comparison.

9. A computer readable data memory storing computer-executable instructions that, when executed by a computer system, cause the computer system to perform a computer-implemented method for improving computer-implemented content management using a dashboard, the method comprising:
processing a user activity in a social networking system through a relevancy filter to determine whether the user activity is relevant to a viral propagation study;
when the user activity is determined to be relevant to the viral propagation study, constructing a user activity cascade by exploring a social graph in the social networking system, starting from a social object node corresponding to the user activity, wherein the user activity cascade comprises social network nodes found during said exploring;
determining that the user activity cascade is virally propagating based at least upon a total size of the user activity cascade; and
generating the dashboard to monitor the user activity cascades, thereby improving computer-implemented content management;
wherein, one or more of:
the method further comprises:
computing a virality measuring statistic of the user activity cascade; and
displaying the virality measuring statistical on the dashboard;
the method further comprises:
compiling a demographic profile of the user activity cascade; and
displaying the demographic profile on the dashboard;
the method further comprises:
analyzing user activities in the user activity cascade to generate a summary expression; and
displaying the summary expression on the dashboard; or
any combination thereof.

10. The computer readable data memory of claim 9, wherein the method further comprises:
computing a predictive trend of user activities in the user activity cascade; and
displaying the predictive trend on the dashboard.

11. The computer readable data memory of claim 9, wherein the method further comprises:

performing content analysis on content objects associated with social network nodes in the user activity cascade to determine a content attribute; and displaying the content attribute on the dashboard.

12. A social networking system for improving computer-implemented content management, the system comprising:

a sampler engine configured to receive user activities from a relevancy filter and randomly or periodically select the user activity for the graph exploration engine as a graph exploration seed;

a graph exploration engine configured to construct a user activity cascade by exploring a social graph in the social networking system, starting from a social object node corresponding to a user activity indicated as relevant for a viral propagation study, wherein the user activity cascade comprises social network nodes found during said exploring;

a cascade repository configured to maintain an index of one or more user activity cascades into the user activity cascade; and a virality determination engine configured to determine that the user activity cascade is virally propagating based on one or more of: a total size of the user activity cascade, an expansion rate of the user activity cascade, a diversity measure of the user activity cascade, or any combination thereof, wherein the determination that the user activity cascade is virally propagating provides the improvement in computer-implemented content management.

13. The social networking system of claim 12, further comprising a cascade analysis engine configured to compute a predictive trend associated with the user activity cascade and to provide the predictive trend to an application service of the social networking system.

* * * * *